United States Patent [19]

Stone et al.

[11] Patent Number: 5,567,540
[45] Date of Patent: Oct. 22, 1996

[54] ELECTROCHEMICAL POWER GENERATING SYSTEM

[75] Inventors: Gordon R. Stone, O'Fallon, Ill.;
Richard L. McGee, Chesterfield, Mo.;
Douglas J. Amick, Ann Arbor, Mich.

[73] Assignee: Voltek, Inc., Belleville, Ill.

[21] Appl. No.: 464,382

[22] Filed: Jun. 5, 1995

Related U.S. Application Data

[63] Continuation of Ser. No. 81,662, Jun. 23, 1993, Pat. No. 5,439,758, which is a continuation-in-part of Ser. No. 955,583, Oct. 2, 1992, Pat. No. 5,415,949.

[51] Int. Cl.$^6$ .............................. H01M 8/06; H01M 8/24
[52] U.S. Cl. .................. 429/63; 429/61; 429/62; 429/14; 429/27
[58] Field of Search ................... 429/14, 17, 27, 429/61, 62, 63

[56] References Cited

U.S. PATENT DOCUMENTS

| | | | |
|---|---|---|---|
| 3,513,030 | 5/1970 | Rosansky et al. | 136/86 |
| 3,513,031 | 5/1970 | Zaromb | 136/86 |
| 3,980,498 | 9/1976 | Urbach et al. | 429/64 |
| 4,081,693 | 3/1978 | Stone | 307/66 |
| 4,246,324 | 1/1981 | de Nora et al. | 429/17 |
| 4,756,980 | 7/1988 | Niksa et al. | 429/27 |
| 4,842,964 | 6/1989 | Tarcy | 429/52 |
| 4,885,217 | 12/1989 | Hoge | 429/27 |
| 4,906,535 | 3/1990 | Hoge | 429/42 |
| 4,908,281 | 3/1990 | O'Callaghan | 429/27 |
| 4,910,102 | 3/1990 | Rao et al. | 429/51 |
| 4,950,561 | 8/1990 | Niksa et al. | 429/27 |
| 5,032,473 | 7/1991 | Hoge | 429/42 |
| 5,053,375 | 10/1991 | Rao | 502/101 |
| 5,200,278 | 4/1993 | Watkins et al. | 429/24 |
| 5,439,758 | 8/1995 | Stone et al. | 429/63 |

OTHER PUBLICATIONS

John F. Cooper & Ernest L. Littauer, "Mechanically Rechargeable, Metal-Air Batteries for Automotive Propulsion", May 26, 1978.
Lockheed Palo Alto Research Laboratories, "Aluminum-Air Battery Cell Hardware Development", Apr. 30, 1982.
John F. Cooper, K. A. Kraftick & B. J. McKinley, "Current Status of the Development of the Refuelable Aluminum-Air Battery" May 10, 1983.
John F. Cooper, "Aluminum-Air Power Cell Research and Development Progress Report", Dec. 1984.
Alupower, Inc., "High Energy Density Disposable Aluminum-Air Battery" (made public between Jun. 23 and Jul. 1, 1992).
"Aluminum-Air Battery Development: Toward an Electric Car", Conservation and Solar, date unknown, pp. 20-33.
Geoff Scamans, "Advances in Battery Technology", Chemistry and Industry, Mar. 17, 1986.
Nigel Fitzpatrick and Geoff Scamans, "Aluminum is a Fuel for Tomorrow", New Scientist, Jul. 1, 1986, pp. 34-37.
Nigel Fitzpatrick and David Strong, "Aluminum-Air, a Battery/Battery Hybrid for an Off-Road Vehicle", Nov. 1988.
D. W. Parish et al., "Demonstration of Aluminum-Air Fuel Cells in a Road Vehicle", SAE Technical Paper Series 891690, 1989, pp. 65-69.

Primary Examiner—Stephen Kalafut
Assistant Examiner—Richard H. Lilley, Jr.
Attorney, Agent, or Firm—Senniger, Powers, Leavitt & Roedel

[57] ABSTRACT

A method of controlling a power generating system comprising a plurality of metal-air cells and a pump for circulating an electrolyte solution through the cells. The method comprises sensing an operating condition of the generating system, and selectively energizing the pump as a function of the sensed operating condition whereby energizing the pump causes the electrolyte solution to be circulated through the cells.

2 Claims, 13 Drawing Sheets

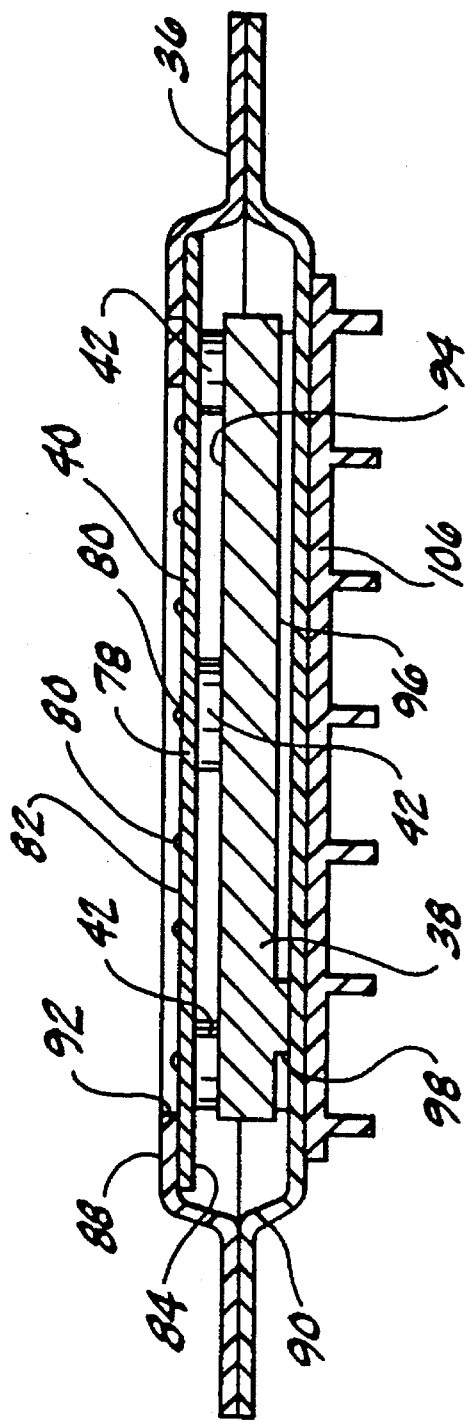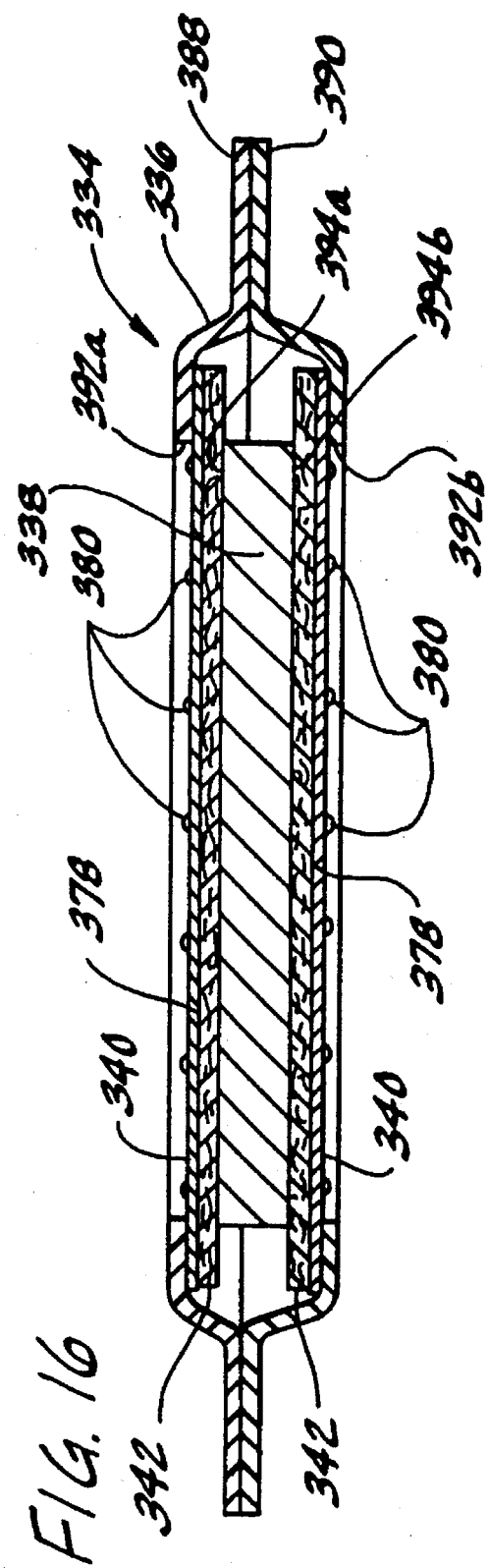

ELECTROCHEMICAL POWER GENERATING SYSTEM

This is a continuation of application Ser. No. 08/081,662, filed Jun. 23, 1993, now U.S. Pat. No. 5,439,785, which is a continuation of U.S. Pat. No. 5,415,949, issued May 16, 1995 (Ser. No. 07/955,583, filed Oct. 2, 1992).

BACKGROUND OF THE INVENTION

This invention relates to metal-air cells and, more particularly, to electrochemical power generating systems using metal-air cells.

Metal-air cell batteries generally have several serially connected metal-air cells. Each cell has an anode made of a reactive metal such as aluminum or magnesium and an air cathode spaced from the anode. A suitable electrolyte, such as an aqueous solution of KOH, NaOH or NaCl, electrochemically couples the anode and cathode to produce an electrical potential and supply current to an electrical load. During the electrochemical reaction, the anode is consumed. When the anodes are consumed, the battery must be refueled with new anodes and fresh electrolyte. Such refueling generally requires draining of spent electrolyte from the battery, adding new metal anodes one-by-one, and replenishing the electrolyte. The refueling operation in prior art metal-air batteries is time consuming and usually results in the machine or device powered by the battery being inoperative for an extended period during refueling.

Another problem with prior metal-air cell batteries is that during anode consumption the distance between the anode and cathode increases causing a decrease in voltage, power output, and efficiency of the battery.

Another problem is degradation of the electrolyte solution. As the reaction in the cell proceeds, reaction products build up in the electrolyte solution, and concentration of the electrolyte increases, both of which cause a decrease in performance of the cell.

Another problem with prior metal-air cell batteries is the length of time it takes for the battery to become fully operational, i.e., to deliver full power. The temperature of the electrolyte circulating through the battery must be relatively high (e.g., 150° F.) before the battery can fully energize the load. A metal-air cell cannot deliver much power at low temperatures and, consequently cannot generate much heat. Thus, if the electrolyte is initially cold, it typically takes several minutes to heat the circulating electrolyte to a sufficient operating temperature. Such a warm-up time is often a nuisance to the user and renders such metal-air cell batteries impractical for many applications. Moreover, when the cell is disconnected from its electrical load, the anode continues to be consumed at a low rate and thereby reduces the operating life of the cell.

SUMMARY OF THE INVENTION

Among the objects of the present invention may be noted the provision of improved metal-air cells and electrochemical power generating system which overcomes disadvantages and deficiencies associated with prior art cells and systems; the provision of such a generating system which maintains a substantially constant distance between the anode and cathode during consumption of the anode; the provision of such metal-air cells and power generating system which can be quickly and easily refueled when the anodes are depleted or consumed; the provision of such a power generating system which more rapidly delivers full power; and the provision of such a generating system which discontinues or reduces anode consumption when the metal-air cells are disconnected from its electrical load.

Generally, an electrochemical power generating system of the present invention includes a metal-air cell for a metal-air cell battery. The cell comprises a flexible, collapsible pouch having first and second opposed walls. At least one of the walls includes an air-permeable and electrolyte-impermeable air cathode. The cell further comprises a metal anode within the pouch and surrounded thereby having a first reaction face opposing the cathode, a spacer between the cathode and the reaction face of the anode for preventing the anode from contacting the cathode, and electrolyte intake and discharge ports for the pouch for passage of electrolyte through the pouch and between the anode and cathode.

In another aspect of the present invention, a metal-air cell battery has a row or stack of collapsible metal-air cells arranged in face-to-face relationship and electrically interconnected. Each cell includes a flexible, collapsible pouch, a metal anode within the casing and having a reaction face, and an air cathode having an outer face and an inner face with the inner face opposing the reaction face. A spacer is positioned between the inner face of the cathode and the reaction face of the anode for preventing the anode from contacting the inner face of the cathode. The cell also includes an electrolyte intake port and an electrolyte discharge port for passage of electrolyte through the casing and between the anode and cathode. The battery further comprises apparatus for urging opposite ends of the row of collapsible cells toward each other thereby to urge the anode and cathode of each cell toward each other so that the distance between the inner face of the cathode and the reaction face of the anode of each cell remains generally constant during consumption of the anode.

In still another aspect of the present invention, an electrochemical power generating system has a first portion, including an electrolyte pump and electronic controls for controlling operation of the pump, and a separable second portion. The second portion comprises a row of metal-air cells electrically inter-connected together. Each cell includes a casing, a metal anode within the casing and having a reaction face, and an air cathode having an outer face and an inner face with the inner face opposing the reaction face. A spacer is positioned between the inner face of the cathode and the reaction face of the anode for preventing the anode from contacting the cathode. The casing is provided with an electrolyte intake port and an electrolyte discharge port for passage of electrolyte through the casing and between the anode and cathode. A manifold having an intake port and a plurality of discharge ports is in fluid communication with the electrolyte intake ports of the cells so that electrolyte flowing through the manifold is directed through the intake ports of the cells. The second portion also includes an electrolyte reservoir and a mechanism for operatively connecting the discharge ports of the cells with the reservoir so that electrolyte discharged from the cells flows to the reservoir. The electrolyte reservoir and intake port of the manifold is operatively connectable with the electrolyte pump for fluid communication therewith so that the pump is able to draw electrolyte from the reservoir and force it into the manifold. The second portion is releasably attachable to the first portion so that the second portion can be quickly attached to and detached from the first portion.

In yet another aspect of the present invention, an electrochemical power generating system comprises at least one metal-air cell, an electrolyte reservoir, and electrolyte transport apparatus for drawing electrolyte from the reservoir and moving it through the cell. A first sensor senses an operating condition of the power generating system. The system also includes a controller for selectively energizing the electrolyte transport apparatus as a function of the sensed operating condition whereby energizing the electrolyte transport apparatus causes electrolyte to be drawn from the reservoir and transported to the cell.

In yet another aspect of the present invention, an electrochemical power generating system comprises a battery having at least one metal-air cell including a casing, a metal anode within the casing and having a reaction face, and an air cathode having an outer face and an inner face with the inner face opposing the reaction face. The system further comprises apparatus for applying a bias voltage to the battery during periods when the battery is not supplying current to a load thereby to inhibit anode depletion. The voltage is of like polarity and of a potential at least equal to that of the battery.

In yet another aspect of the present invention, an electrochemical power generating system for supplying power to an electrical load comprises a primary battery. The battery has at least one metal-air cell including a casing, an anode within the casing and having a reaction face, an air cathode having an outer face and an inner face with the inner face opposing the reaction face, an electrolyte intake port in the casing for passage of electrolyte through the casing and between the anode and cathode, and an electrolyte discharge port in the casing. The power generating system further includes apparatus for heating electrolyte within the battery when the temperature of the electrolyte is below a predetermined temperature.

Other advantages and features will be in part apparent and in part pointed out hereinafter.

BRIEF DESCRIPTION OF THE DRAWINGS

FIG. 3 is a section on line 3—3 of FIG. 2 showing one of the cells;

FIG. 16 is a cross-sectional view of an alternative embodiment of a metal-air cell similar to the cell of FIG. 3 except the cell of FIG. 16 has two cathodes;

Corresponding reference characters indicate corresponding parts throughout the several views of the drawings.

DESCRIPTION OF PREFERRED EMBODIMENTS

Figure 1:
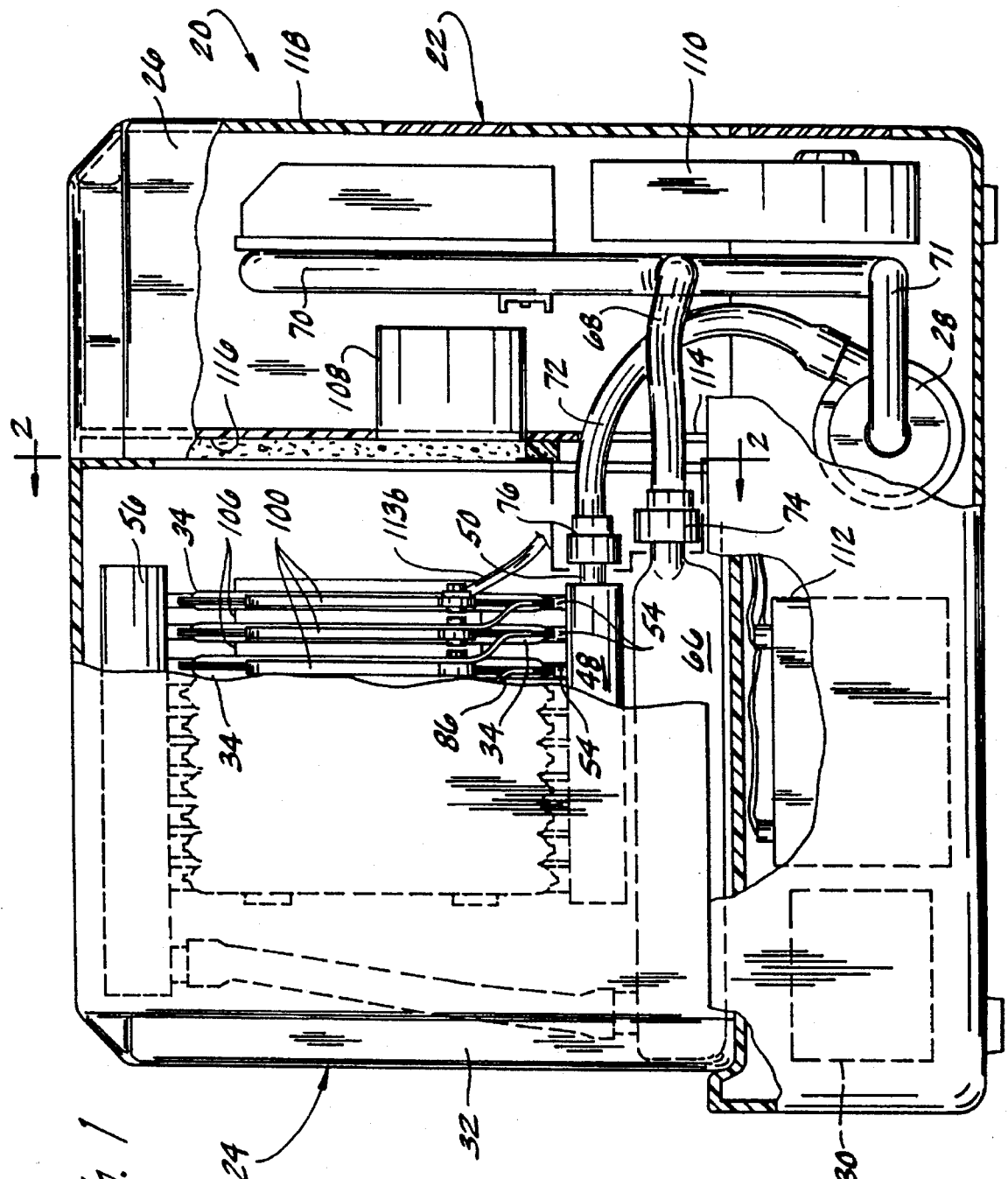
FIG. 1 is an elevational view of an electrochemical power generating system of the present invention with portions broken away to show many of the components of the system.
Figure 2:
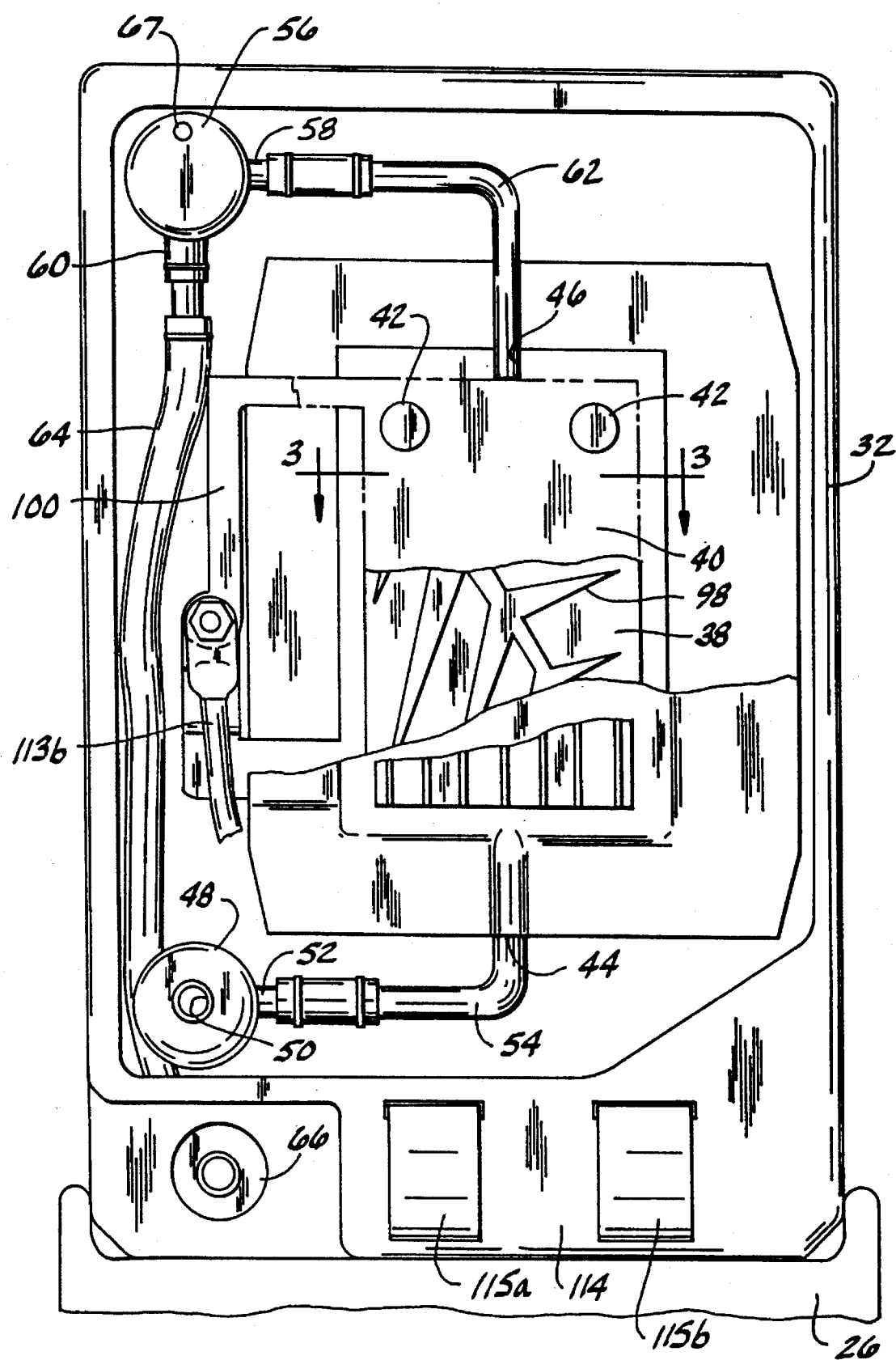
FIG. 2 is a section on line 2—2 of FIG. 1, showing an end view of the second portion with portions broken away to show the elements of one of the cells.

Referring to FIGS. 1–3, an electrochemical power generating system of the present invention, generally indicated at 20, is shown to have a base unit, constituting a first portion, generally indicated at 22, and a replaceable fuel unit, constituting a second portion, generally indicated at 24. The base unit 22 includes a housing 26, an electrolyte pump 28 within the housing 26, and a controller 30, constituting means for controlling operation of the pump 28. The fuel unit 24 comprises a housing 32 and a row of metal-air cells 34 electrically interconnected within housing 32. Each cell 34 includes a flexible pouch 36, a metal anode 38 within pouch 36, an air cathode 40, and spacers 42 for preventing anode 38 from contacting cathode 40. Pouch 36 has an electrolyte inlet port 44 and an electrolyte discharge port 46 for passage of electrolyte through pouch 36 and between anode 38 and cathode 40. A supply manifold 48 is within housing 32 for delivering electrolyte to the cells 34. The manifold 48 has an intake port 50 and a plurality of discharge ports 52. The discharge ports 52 are in fluid communication with the inlet ports 44 of the cells 34 via a plurality of flexible fluid lines 54 so that electrolyte flowing through manifold 48 is directed through the inlet ports 44 of the cells 34. Also within housing 32 is a discharge manifold 56 having a plurality of intake ports 58 and a discharge port 60. A plurality of flexible fluid lines 62 connect discharge ports 46 of cells 34 to intake ports 58 of discharge manifold 56. A conduit 64 connects discharge port 60 of discharge manifold 56 to an electrolyte reservoir 66 positioned below supply manifold 48. Electrolyte flows from cells 34, through discharge manifold 56, and then into reservoir 66.

As shown in FIG. 1, a conduit 68 connects reservoir 66 to a heat exchanger 70 (preferably a fin and tube type heat exchanger) within housing 26. Pump 28 is connected to heat exchanger 70 via a conduit 71 and to intake port 50 of supply manifold 48 via a conduit 72. Thus, reservoir 66 and intake port 50 of manifold 48 are operatively connectable with the electrolyte pump 28 for fluid communication therewith so that pump 28 is able to draw electrolyte from reservoir 66 and force it into manifold 48. The electrolyte flows through cells 34 and electrochemically couples anodes 38 and respective cathodes 40. The flowing electrolyte also flushes reaction products from cells 34. Hydrogen gas generated by the reaction in cells 34 is carried to discharge manifold 56 by the electrolyte flowing through cells 34. The hydrogen gas bubbles out of the electrolyte in discharge manifold 56 and is vented through a vent hole 67 in manifold 56. Preferably, reservoir 66 is releasably connected to conduit 68 and conduit 72 is releasably connected to intake port 50 with quick-release fluid line connectors 74 and 76, respectively. Connectors 74 and 76 releasably attach fuel unit 24 to base unit 22 so that fuel unit 24 can be quickly attached to and detached from base unit 22. When anodes 38 are consumed, fuel unit 24 can be detached quickly from base unit 22 and replaced with a new second unit. Thus, power generating system 20 can be rapidly refueled, thereby minimizing down time. The used fuel unit 24 can then be refueled or reclaimed.

Figure 4:
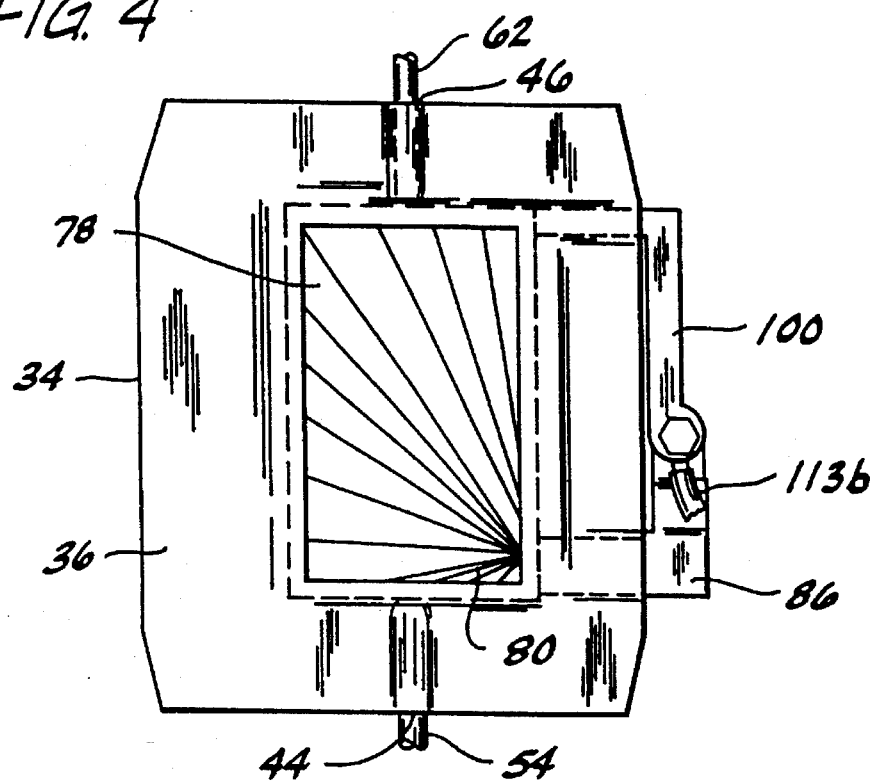
FIG. 4 is a rear elevational view of one of the cells of the power generating system of FIG. 1.

As shown in FIGS. 3 and 4, cathode 40 has a substrate 78 and a current collector 80 attached to substrate 78. Substrate 78 has an outer face 82 and an inner face 84. Substrate 78 is a sheet material (such as POREX® available from Porex Technology Corp. of Georgia) formed with or embedded with an activated carbonaceous material and is air-permeable and electrolyte-impermeable. Current collector 80 is a thin layer of electrically conductive material, such as nickel or stainless steel, formed on one of the faces of substrate 78. Preferably, current collector 80 comprises a printed circuit on one of the faces of substrate 78 in a pattern having a dendritic web extending from a common conductor 86. The printed circuit may be formed on substrate 78, for example, by chemical etching, photo screening, or hot-foil stamping.

Pouch 36 is flexible and compressible and has first and second opposed walls 88 and 90, preferably formed of a polymeric material, such as polyethylene. The first wall 88 has a window opening 92 with the margins of substrate 78 permanently sealed to first wall 88 all around window opening 92. It is to be understood that window 92 may be a specially treated portion of wall 88. In either case, only the window area is active and functions as a cathode. The exposed region of substrate 78, i.e., the portion of substrate 78 encompassed by window opening 92, is the portion of substrate 78 which performs the cathodic function. Preferably, the margins of substrate 78 are bonded to first wall 88 by an appropriate adhesive. Alternatively, substrate 78 could be secured to first wall 88 by heat sealing. Preferably, the carbonaceous material is deposited only in the interior region of substrate 78 with the margins of substrate 78 being relatively free of such material. Having no (or little) carbonaceous material at the margins of substrate 78 enhances securement of substrate 78 to first wall 88. Substrate 78 may also be formed of fibrillated polyolefin having a sufficient amount of carbonaceous material in the interior region to provide the desired electrolytic reactions and having a reduced amount of carbonaceous material (or none at all) at the margins to enhance securement to first wall 88. The ratio of carbonaceous material to fibrillated polyolefin may increase gradually from the edges of substrate 78 to the center or may increase in an abrupt step. Alternatively, or additionally, the margins of substrate 78 may be impregnated with a substance (such as polyethylene in solution) which promotes bonding to first wall 88.

Figure 5:
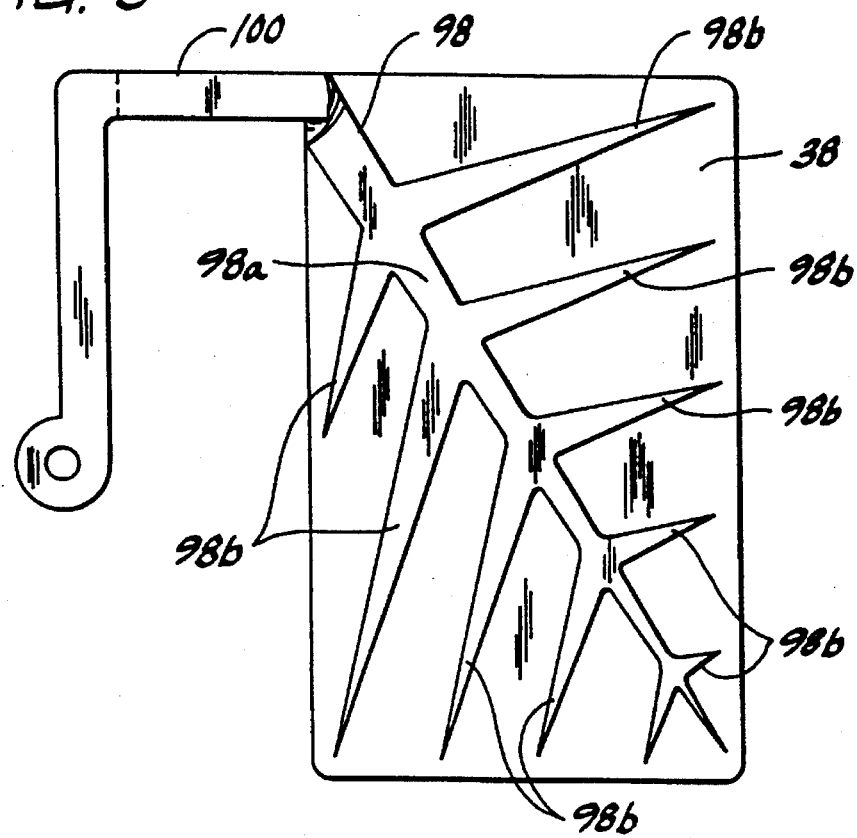
FIG. 5 is a view of one of the anodes of the power generating system of FIG. 1.

Referring to FIGS. 3 and 5, anode 38 is a generally flat plate of aluminum, aluminum alloy, or other suitable metal such as magnesium, having a first face, constituting a reaction face 94, and a second face 96. The reaction face 94 opposes the inner face 84 of the cathode 40. An electrically conductive raised dendritic pattern 98 is on second face 96 and extends from a common conductor 100. The dendritic pattern 98 of anode 38 comprises a tapering main stem 98a that starts at the common terminal conductor 100 and extends substantially across the second face 96 and a plurality of tapering branches 98b extending from main stem 98a. During operation of power generating system 20, anode 38 is consumed from its reaction face 94 toward its second face 96. If the anode is not consumed uniformly along the reaction face or if the thickness of the anode is not uniform (i.e., if there are thin spots), breaks or openings can form in the anode before it is substantially consumed. These breaks can isolate portions of the anode from the conductor, resulting in a partial or total reduction of energy output from the cell. To prevent isolation of these portions from the conductor, the dendritic pattern 98 protrudes from second face 96. Even if breaks or openings form in anode 38, dendritic pattern 98 keeps all portions of anode 38 in electrical contact with conductor 100. Thus, pattern 98 provides structural integrity and electrical communication across anode 38 to conductor 100 as the metal in anode 38 is consumed. Preferably, anode 38, including dendritic pattern 98, is formed from a single homogeneous piece of metal.

Spacers 42 are positioned between cathode 40 and the reaction face 94 of anode 38 to physically isolate anode 38 from cathode 40 by a predetermined spacing, typically on the order of about 3 mm. Spacers 42 may be nubs or bosses integral with substrate 78 and projecting from the inner face 84 of substrate 78. Alternatively, anode-cathode spacing may be maintained by a non-conducting lattice of crisscrossing members as described in co-pending application Ser. No. 07/955,583, incorporated herein in its entirety.

Figure 6:
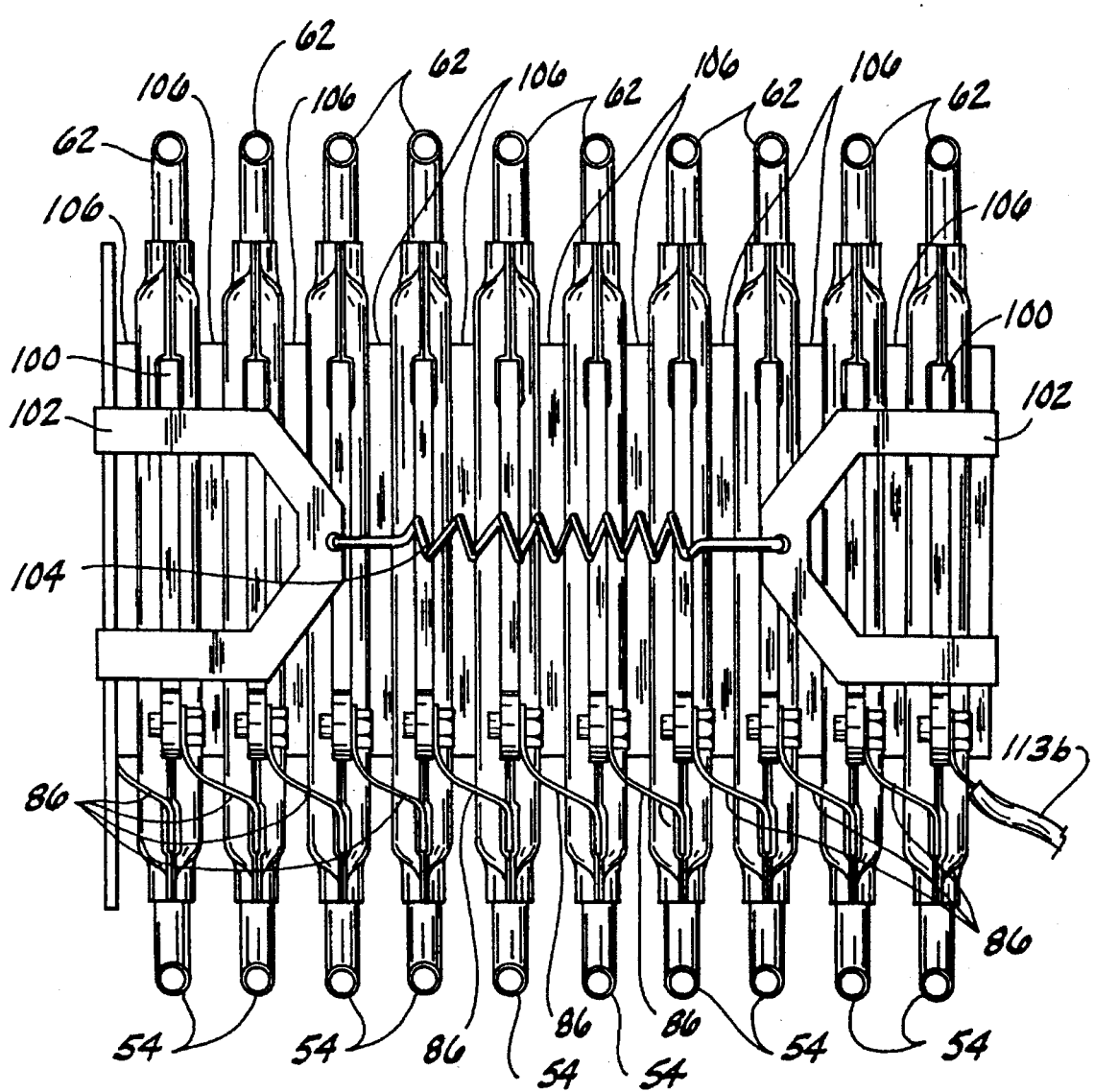
FIG. 6 is an elevational view of the row of cells of the power generating system of FIG. 1 with opposite ends of the row of cells being urged together.
Figure 7:
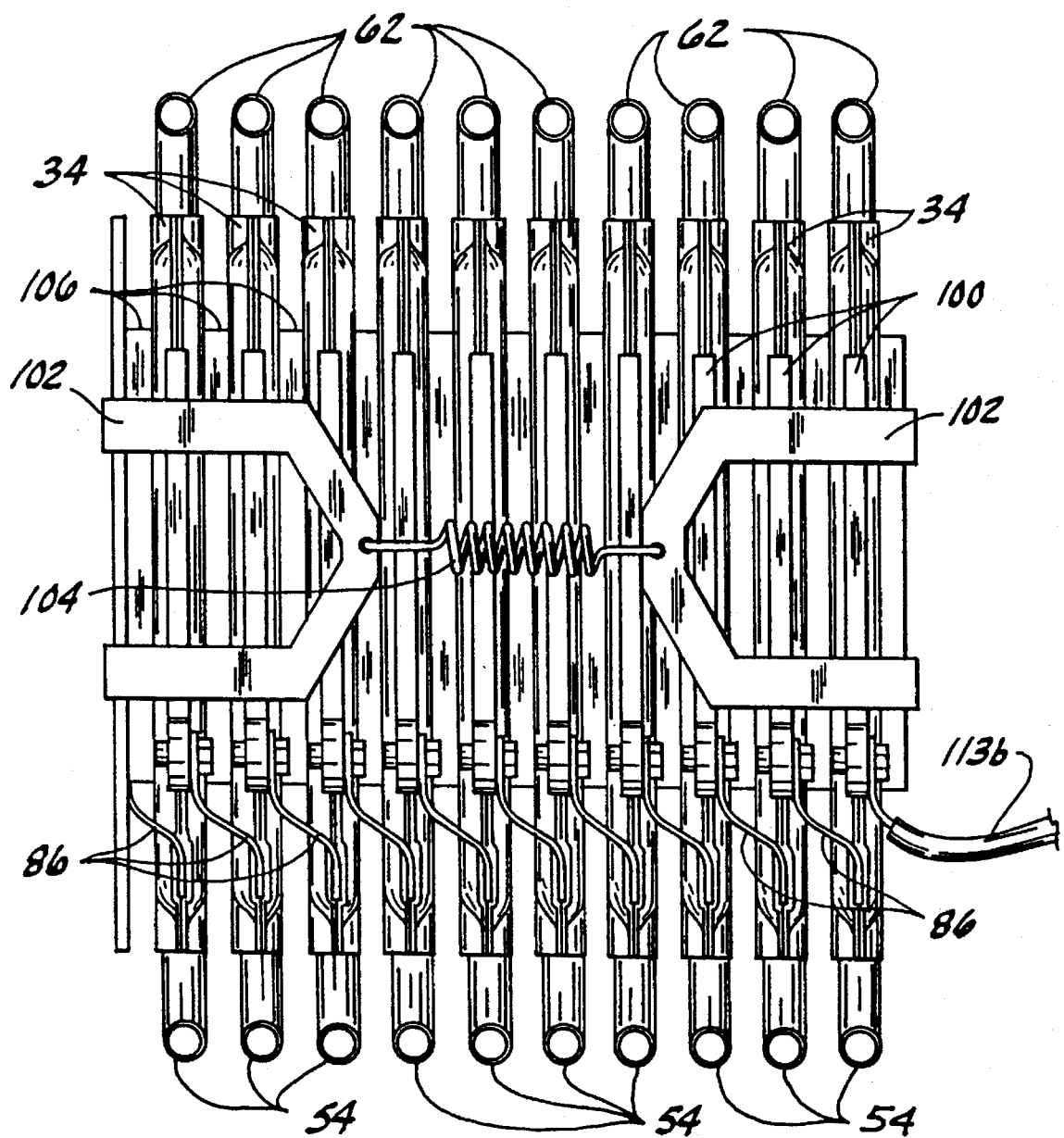
FIG. 7 is an elevational view similar to FIG. 6 except the anodes have been consumed and the cells have been compressed.

Referring to FIGS. 6 and 7, the entire row of cells 34 is preferably surrounded by a resilient harness having banding straps 102 and tension springs 104 (only one of which is shown). The straps 102 extend around opposite ends of the row of cells 34 and are connected together by springs 104. Although not shown, it is to be understood that the harness is electrically insulated from terminal connectors 100 and 86. Springs 104 are tensioned to urge opposite ends of the row of cells 34 toward each other. Since pouch 36 of each cell 34 is flexible, the harness urges the anode 38 and cathode 40 of each cell 34 toward each other with spacers 42 (see FIG. 3) of each cell being squeezed by the reaction face 94 of anode 38 and the inner face 84 of cathode 40. FIG. 6 shows the row of cells 34 before anodes 38 have begun to be consumed and, therefore, cells 34 and their respective anodes are relatively thick. FIG. 7 shows the row of cells 34 with most of each anode being consumed and, therefore, cells 34 and their respective anodes are relatively thin and the row of cells 34 is compressed. Preferably, fluid lines 54 and 62 are flexible to accommodate contraction or compression of the row of cells 34. Alternatively, the intake and discharge manifolds could each have a bellows-type configuration which contracts as the row of cells 34 contracts. Since anode 38 and cathode 40 are being squeezed against spacer 42, the distance between the inner face 84 of cathode 40 and the reaction face 94 of anode 38 remains substantially constant (i.e., the same as the thickness of spacers 42) during consumption of anode 38. Since the distance between cathode 40 and reaction face 94 remains substantially constant, consumption of anode 40 does not result in a decrease in voltage and power output of the cell. Also, this distance remains substantially constant during consumption of anode 38 regardless of the initial thickness of anode 38. With thicker anodes, the metal-air cell battery is operable for longer periods between refueling and without an appreciable reduction in power output.

Although harness 103 constitutes the preferred means for urging the anode and cathode of each cell toward each other, it is to be understood that other means may be employed without departing from the scope of this invention. Examples of other ways of urging opposite ends of the row of cells 34 together include: tensioned elastomeric bands placed around the row of cells; interacting wedges at ends of the row of cells which produce a compressive force against the ends; two rigid end plates engaging opposite ends of the row of cells with the end plates being urged toward each other by tensioned springs; compression springs at one end of the row of cells which urge the one end toward the other end; an inflatable bag at one end of the row of cells which, upon inflation, urges the one end toward the other end; or a hydraulic cylinder at one end of the row of cells which, upon being pressurized, urges the one end toward the other end.

Referring again to FIG. 1, the base unit 22 further includes an air pump 108, constituting a depolarization air system, for forcing slightly compressed air across the cathodes. A plurality of inter-cell spacers or separators 106 (also shown in FIGS. 2, 3 and 6), preferably formed of a synthetic resin, are interposed between adjacent cells 34 to provide air spaces adjacent the cathodes so that the depolarizing air can circulate around the cells and to the cathodes. The circulation of air around cells 34 also helps to cool the cells. The thickness of the spacers 106 between cells 34 may vary so that the sizes of the spaces between adjacent cells varies to achieve variable cooling of the cells. For example the inter-cell spacing can decrease from one end of the row of cells to the other, or the inter-cell spacing can decrease from the center of the row of cells toward the ends of the row. The thickness of spacers 106 is selected generally to achieve equalization of the temperatures of the cells 34 in the row of cells.

A cooling fan 110 is within housing 26 for forcing cooling air across the fins of heat exchanger 70 to cool electrolyte within heat exchanger 70. A lead-acid battery 112, or other suitable secondary battery, operates pump 28, controller 30, and pump 108 and fan 110 during start-up of the metal-air cell battery.

Referring to FIGS. 1, 4 and 6, the conductors 86 of cathodes 40 are directly connected to the conductors 100 of anodes 38 of adjacent cells thereby connecting cells 34 in series to each other. Battery stack end cathode conductor 86 is connected to negative contact pad 115a via an electric cable (not shown). Battery stack end anode conductor 100 is connected to positive contact pad 115b via electric cable 113b. Positive and negative electrical contact pads 115a and 115b (see FIG. 2) extend through a side wall 114 of housing 32. The contact pads 115a and 115b are interengageable with two like polarity contact pads (not shown) extending through a side wall 116 of housing 26 for electrically connecting the metal-air cell battery to an external load and to lead-acid battery 112. Base unit 22 further includes positive and negative load engageable terminals (not shown) through a second side wall 118 of housing 26 and suitable conductors (not shown) for providing electrical energy to the terminals.

Figure 8:
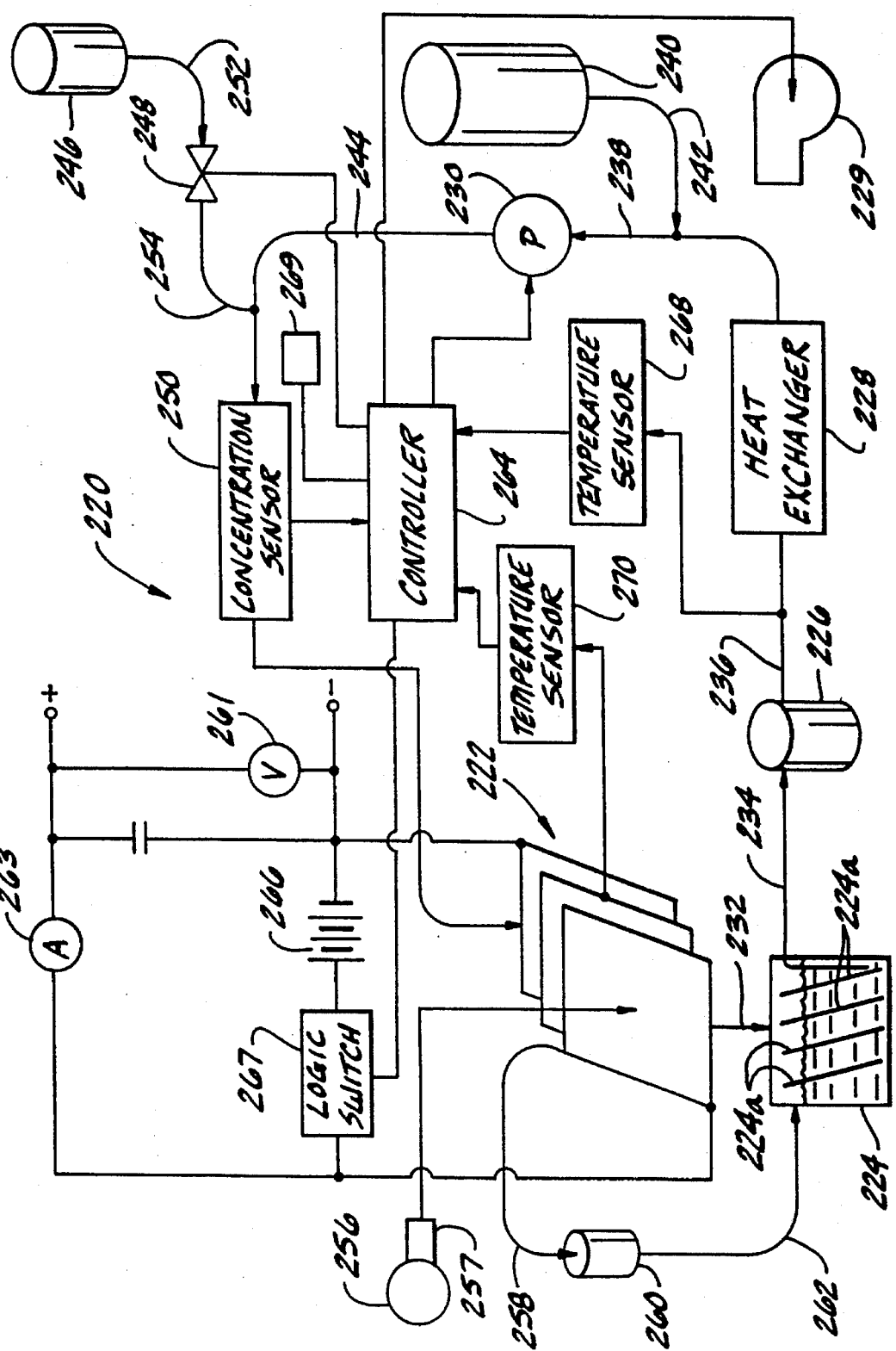
FIG. 8 is a schematic diagram of an alternative embodiment of an electrochemical power generating system of the present invention.

Another embodiment of an electrochemical power generating system of the present invention, generally indicated at 220, is shown schematically in FIG. 8. Power generating system 220 comprises a fluid system, a gas system, and an electrical system. The fluid system includes a sump 224, an electrolyte filter 226, a heat exchanger 228, and a reversible-flow pump 230 for moving electrolyte through a plurality of metal-air cells, generally indicated at 222. Electrolyte flows from cells 222 through a conduit 232 and to sump 224 which includes a plurality of baffles 224a for collection of reaction products discharged from the cells. Electrolyte from sump 224 flows through a conduit 234 to filter 226, which filters reactants, generated in cells 222, from the electrolyte. Electrolyte moves from filter 226 to heat exchanger 228 via a conduit 236. Heat exchanger 228 is preferably a fin and tube type heat exchanger and includes a cooling fan 229 for moving air across the fins for cooling the electrolyte when the electrolyte exceeds a predetermined temperature. Heat exchanger 228 is in fluid communication with pump 230 via a conduit 238. An electrolyte reservoir 240 is in fluid communication with conduit 238 via a conduit 242. Electrolyte from reservoir 240 is introduced into the circulatory system only if and when the electrolyte in sump 224 falls below a minimum acceptable level. The reservoir 240 maintains proper electrolyte level in cells 222. Electrolyte from pump 230 flows through a conduit 244 to cells 222 via a concentration sensor 250. The electrolyte may be an aqueous solution of potassium hydroxide (KOH), sodium hydroxide (NaOH), sodium chloride (NaCl), or any other suitable electrolyte. The electrolyte in sump 224 maybe seeded with micro-crystals of the anticipated reaction products, such as $Al(OH)_3$ in aluminum air cells where the electrolyte is KOH, to cause the reaction products to precipitate out of the electrolyte solution and facilitate the trapping of these products in sump 224.

Power generating system 220 also includes an electrolyte concentrate reservoir 246, a solenoid-actuated metering valve 248, and an electrolyte concentration sensor 250. Concentrate reservoir 246 is in communication with conduit 244 via two conduits 252 and 254 and valve 248. Sensor 250 senses concentration of electrolyte and may be, for example, a conductivity sensor which measures the conductivity of the electrolyte solution to gauge the electrolyte concentration. Alternatively, sensor 250 may be a pH sensor which measures the pH of the electrolyte solution to gauge the electrolyte concentration. When the concentration of the electrolyte falls below a predetermined value, valve 248 meters concentrated electrolyte from reservoir 246 to conduit 244. The concentrated electrolyte increases the concentration of electrolyte transported to cells 222. Thus, weak electrolyte is automatically replenished.

An air pump 256 forces depolarizing air to cells 222. The circulating air is passed through a filter 257 to remove contaminants, particularly carbon particles, that might contaminate the system. The electrochemical reaction in the cells produces hydrogen gas which is vented from the cells by a conduit 258. Conduit 258 communicates with a catalytic bed 260. Air and byproduct gasses, such as hydrogen, from cells 222 are forced to pass through catalytic bed 260 where the hydrogen is recombined with atmospheric oxygen to form water. The water drains from catalytic bed 260 to sump 224 through a conduit 262, where it replenishes moisture lost from the electrolyte during operation of cells 222. Alternatively, or in addition, a vent can be provided to allow $H_2$ gas to escape, with or without the assistance of air pump 256 or fan 229.

Power generating system 220 has a controller 264 for controlling pump 230, cooling fan 229, metering valve 248, and air pump 256. A lead-acid battery 266 or any suitable supplemental battery operates controller 264 and pump 230 during start-up of power generating system 220. During operation of power generating system 220, i.e., when power is being supplied to a load, battery 266 serves as an accumulator for accommodating power surges demanded by the load above the normal output limits of cells 222. Battery 266 is normally connected in parallel with the row of cells 222 via controller-controlled switches 267 described in more detail below. Lead-acid battery 266 provides power to activate generating system 220, and to complete shut-down operations after a master switch 269 is opened. A voltmeter 261 and ammeter 263 are provided to give the operator an indication of the system voltage and the amount of current being drawn as power generating system 220 is loaded. Power generating system 220 could also be provided with other indicators, such as temperature indicators, electrolyte fluid level indicators, and a fuel indicator indicating the thickness of the anodes or the operating time remaining.

Figure 9:
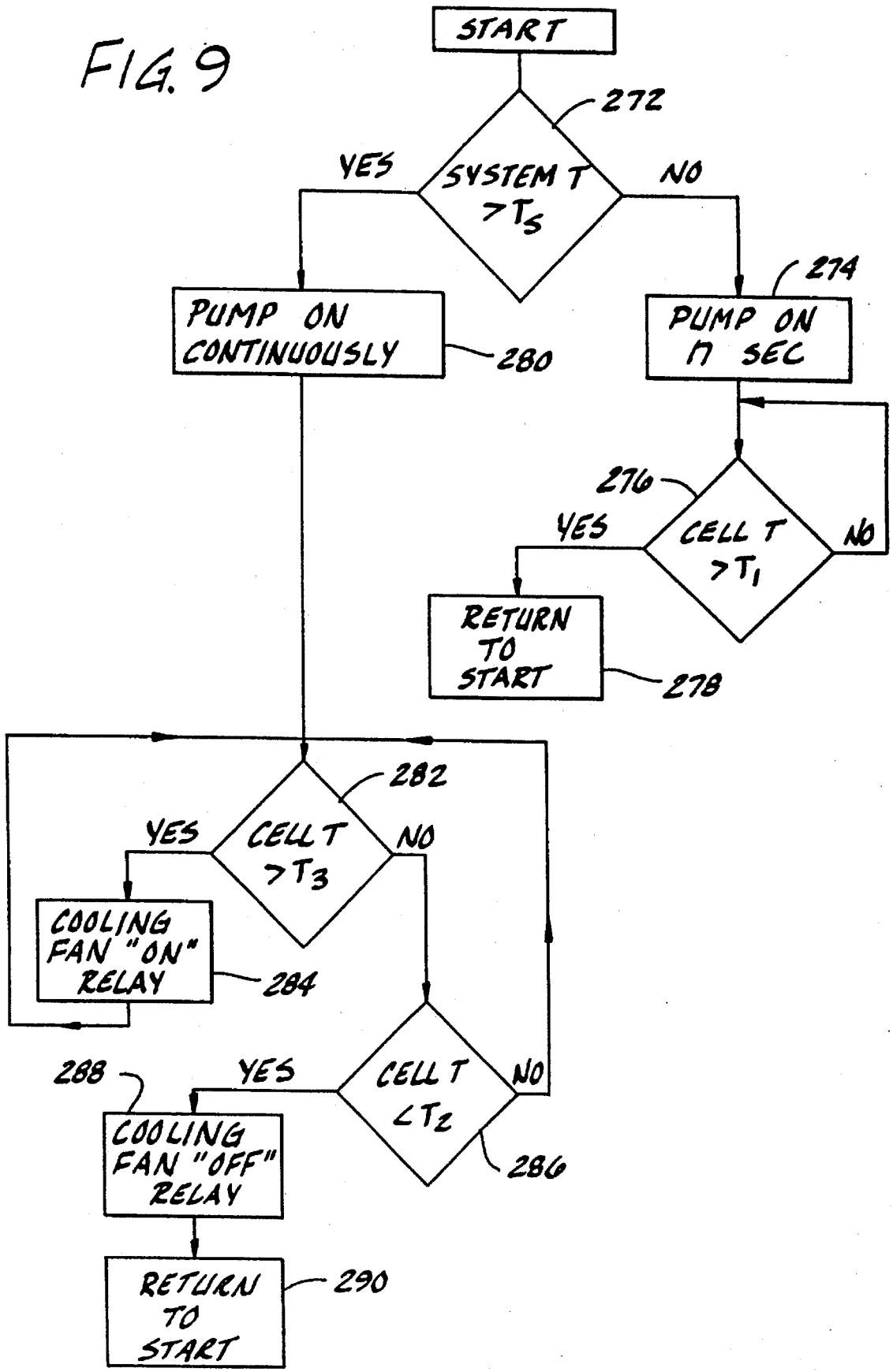
FIG. 9 is a flow chart showing operation of the microprocessor of the power generating system of FIG. 8.
Figure 10:
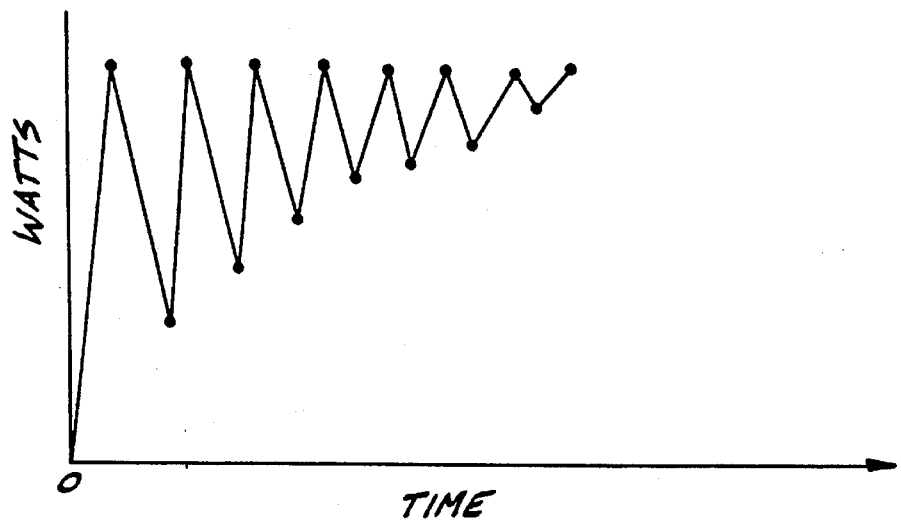
FIG. 10 is a battery power versus time chart of the metal-air cell battery of the power generating system of FIG. 8 as electrolyte is pulsed through the cells.
Figure 11:
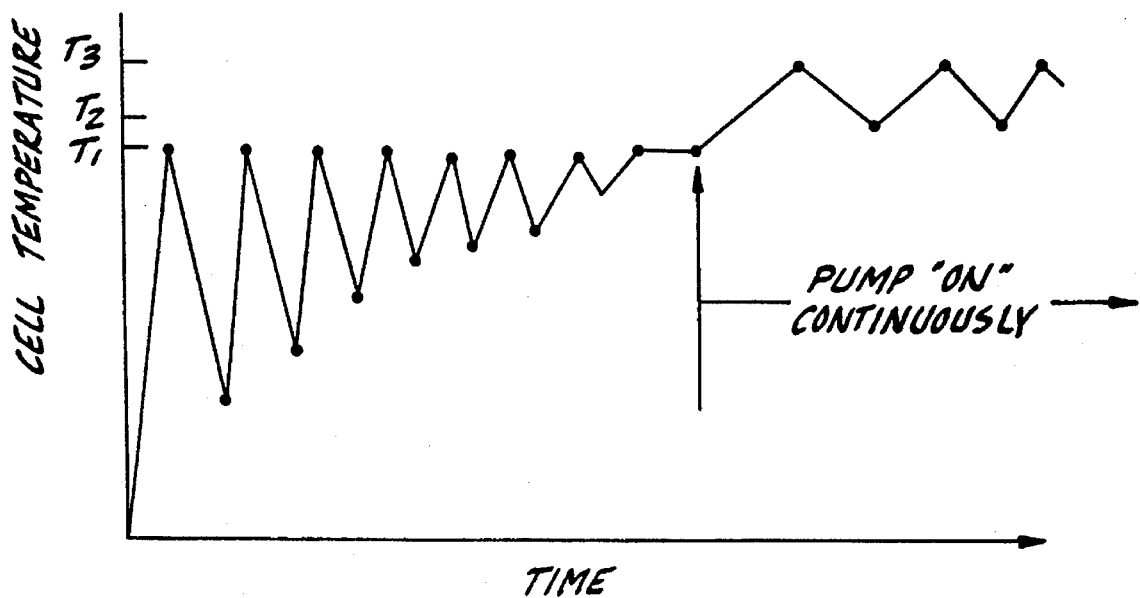
FIG. 11 is a cell temperature versus time chart of a metal-air cell of the power generating system of FIG. 8 as electrolyte is pulsed through the cell.

Referring to FIG. 8 and the flow chart of FIG. 9, the operation of pump 230 and fan 229 by controller 264 will be described. Controller 264 enables cells 222 to rapidly reach full power even when the electrolyte is initially cold. A first temperature sensor 268 senses electrolyte temperature in the circulatory system. A second temperature sensor 270 is in at least one of the cells for measuring the temperature of electrolyte in the cells. Initially, no electrolyte is in the cells of battery 222. When the power generating system 220 is turned on, controller 264, at step 272, compares the system temperature, as measured by first sensor 268, with a predetermined temperature $T_S$. If the system temperature does not exceed temperature $T_S$, controller 264 activates pump 230 for a brief predetermined duration $D_1$ at step 274. This brief activation causes a charge (volume) of electrolyte to be pumped into the cells. The electrolyte charge is held statically (or near statically) within the cells so that it quickly absorbs heat from the electrochemical reaction taking place between the cathodes and anodes. In step 276, after the charge is pumped into the cells, controller 264 compares the electrolyte temperature in the cells, as measured by second sensor 270, with a predetermined temperature $T_1$. If the cell temperature does not exceed temperature $T_1$, controller 266 reexecutes step 276, and repeatedly does so until the cell temperature exceeds temperature $T_1$. When temperature $T_1$ is exceeded, controller 264 returns to start at step 278. If the system temperature does not exceed temperature $T_S$, controller 264 will repeat steps 272–278. As steps 272–278 are repeated, a fresh charge of electrolyte is pumped into the cells and the old charge (i.e., the one heated during the previous cycle) is forced into sump 224. Controller 264 will repeat steps 272–278, incrementally elevating the temperature in the fluid system (including reservoir 240), until the system temperature exceeds temperature $T_S$. By pulsing charges of electrolyte into the cells and allowing them to remain static until they reach an optimal temperature, cells 222 can operate at near full power without waiting for all the electrolyte in the system to heat up. Also, since cells 222 quickly operate at near full power, the system electrolyte is heated at a much faster rate than could be accomplished with a continuous flow system. Graphs representing battery power vs. time and cell temperature vs. time during electrolyte pulsing are shown in FIGS. 10 and 11.

Alternatively, if the system temperature is less than $T_S$, then the pump 230, may be repeatedly turned on for a first predetermined period of time $t_1$ (n seconds long) and turned off for a second predetermined period of time $t_2$ (m seconds long) until the system temperature reaches $T_S$. In particular, if the temperature of the electrolyte solution is not greater than $T_S$, then the controller turns pump 230 on for the first period of time $t_1$ sufficient to fill the cells with electrolyte, and then turns the pump off and waits the second predetermined period of time $t_2$. The controller then determines whether the temperature of the electrolyte solution in the cells (as sensed by a suitable temperature sensor) is greater than a predetermined temperature $T_1$. If the temperature of the electrolyte solution is not greater than $T_1$, then the controller turns the pump on for the predetermined period of time $t_1$ to exchange the electrolyte solution in the cells, and then turns the pump off, and again waits the second predetermined period of time $t_2$, before the cell temperature is again read. If the temperature of the electrolyte solution is greater than $T_1$, then the controller determines whether the system temperature has reached the temperature $T_S$.

When controller 264 determines that the system temperature exceeds temperature $T_S$, pump 230 is operated for continuous flow in step 280. In step 282, controller 264 compares the electrolyte temperature in the cells, as measured by second sensor 270, with a predetermined temperature $T_3$. If the cell temperature exceeds temperature $T_3$, controller 264, in step 284, energizes cooling fan 229 to cool electrolyte passing through heat exchanger 228. If in step 282, the cell temperature does not exceed temperature $T_3$, controller 264 compares the cell temperature with a predetermined temperature $T_2$ (which is less than temperature $T_3$) in step 286. If the cell temperature is lower than temperature $T_2$, controller 264 signals a relay for deactivating cooling fan 229 in step 288. Controller 264 then returns to start in step 290. Temperatures $T_2$ and $T_3$ are selected to maintain a stable temperature for the electrolyte solution within the optimum operating range of the system. Thus, controller 264 selectively energizes fan 229 for controlling cooling of the electrolyte.

Controller 264 controls metering valve 248 in response to electrolyte concentration sensor 250, opening valve 248 to release concentrated electrolyte into conduit 244 to boost the concentration of electrolyte when sensor 250 detects that the concentration has fallen below a predetermined level. Controller 264 may further control pump 230 by varying the pulse duration $D_1$ as a function of electrolyte temperature. For example, controller 264 could cause duration $D_1$ to increase as the system temperature increases. Also, controller 264 could control pump 230 as a function of some operating condition of cells 222 other than electrolyte temperature, For example, pump 230 may be operated as a function of a voltage generated by cells 222.

As noted above, controller 264 also controls operation of power generating system 220 during shut-down. When a master switch 269 is manually set so that system 220 is deactivated, controller 264 initially connects lead-acid battery 266 across the row of cells 222, applying reverse polarity voltage to inhibit electron flow and thus help protect the anodes in cells 222 from further electrochemical depletion. However, if system 220 is not turned on again within a predetermined duration $D_2$ (e.g., one hour), then a timing switch within controller 264 disconnects the lead-acid battery 266 from cells 222 and sends a signal to cause pump 230 to operate in reverse pump mode to draw electrolyte from the cells and force it back through heat exchanger 228 and into sump 224. After a predetermined duration, or when cells 222 are substantially empty, controller 264 deactivates pump 230.

Figure 12:
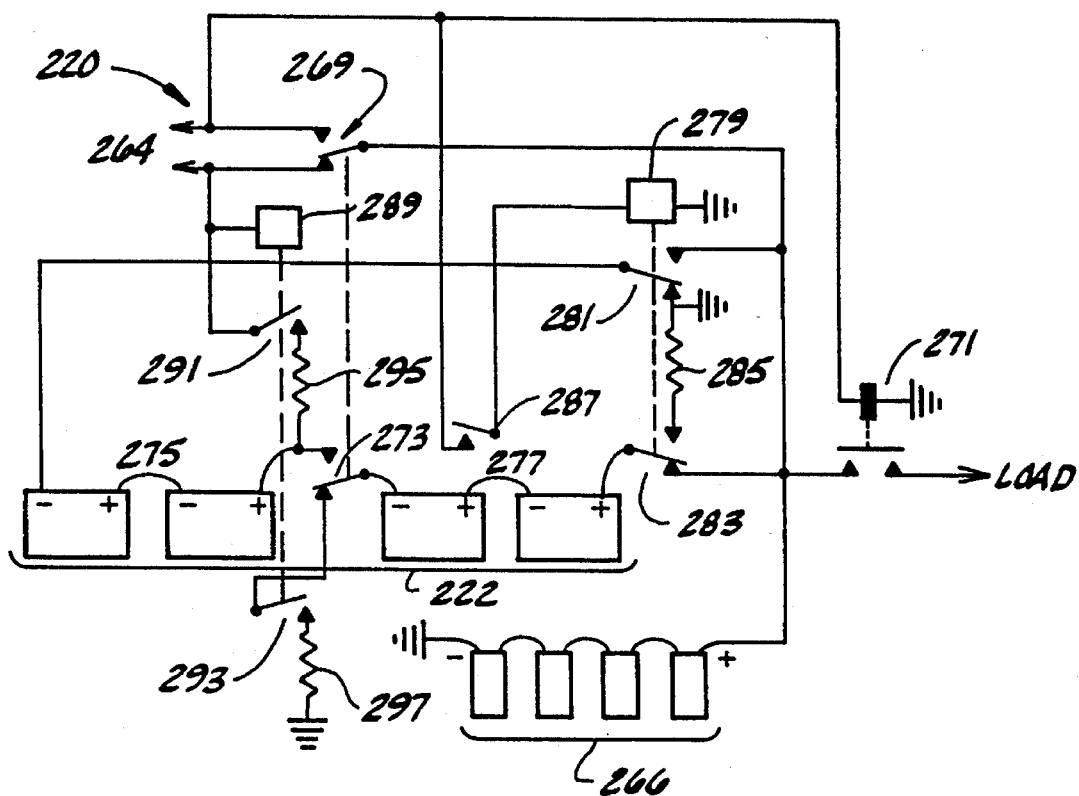
FIG. 12 is a schematic diagram of the power system in a deactivated position.
Figure 13:
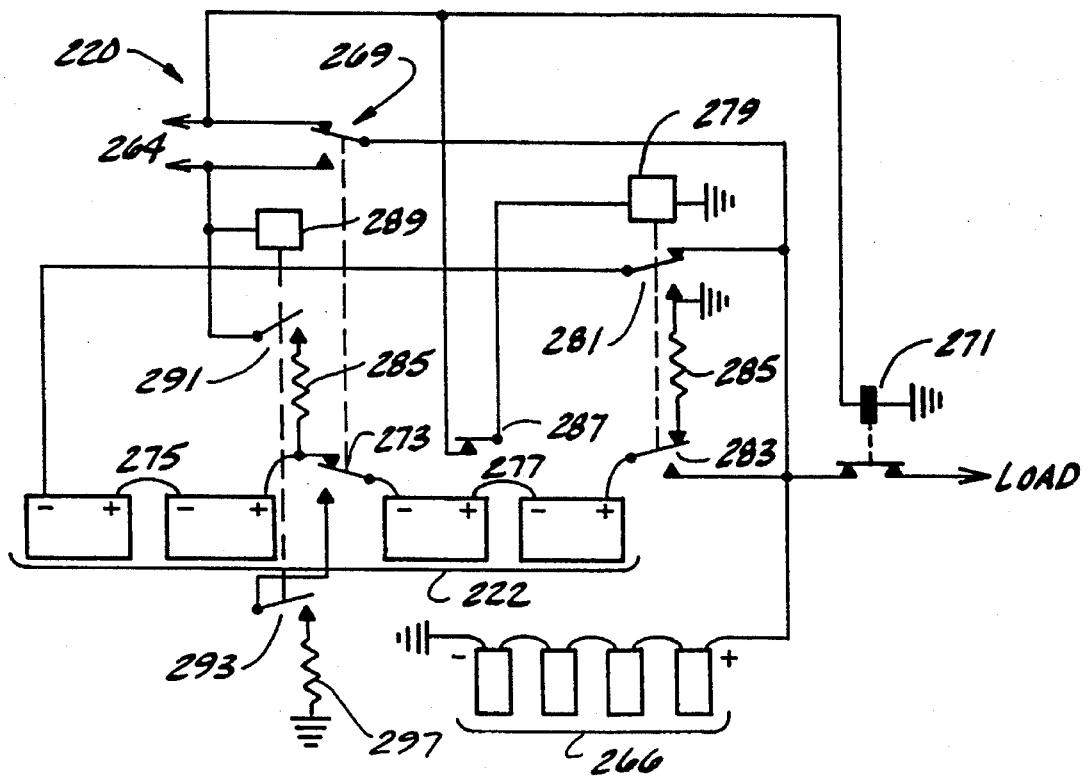
FIG. 13 is a schematic diagram of the power system during warm-up, immediately after being activated.
Figure 14:
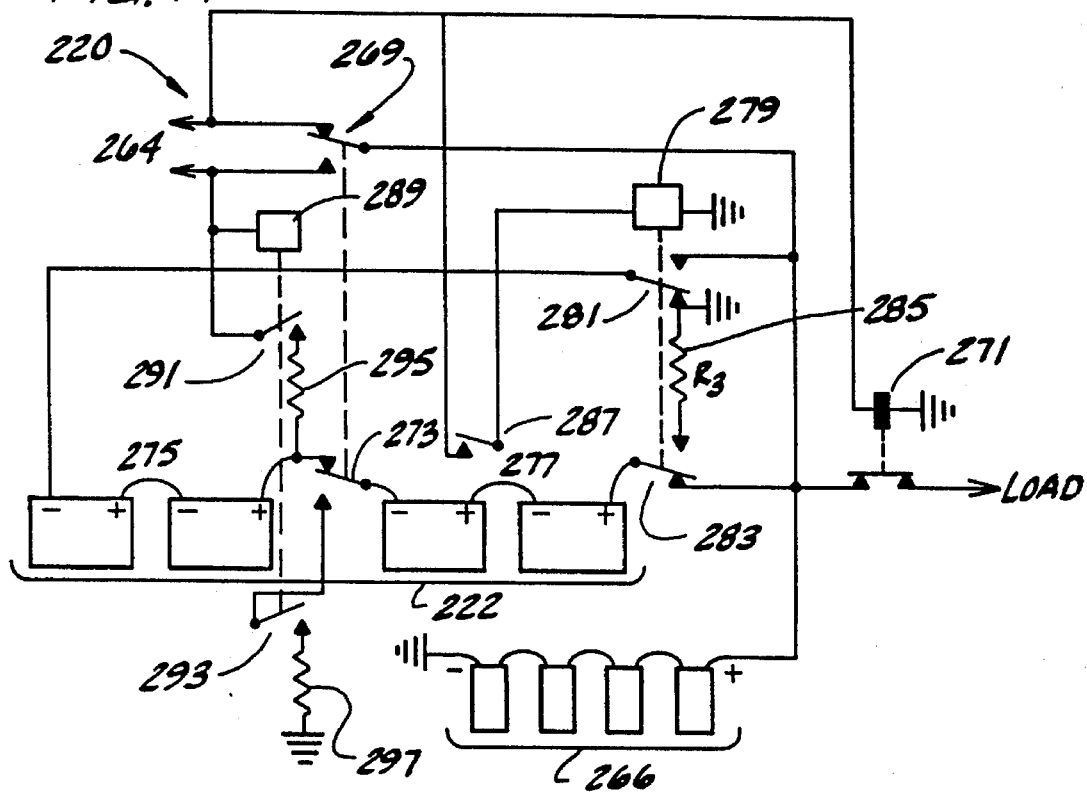
FIG. 14 is a schematic diagram of the power system during normal operation.

The start up and shut down operations of system 220 are illustrated in FIGS. 12–15. In FIG. 12, system 220 is shown in a deactivated state, with no power being supplied to the load. In FIG. 13 the system is shown immediately after switch 269 has been moved to the position shown thereby causing current from lead-acid battery 266 to be provided to controller 264, and causing a solenoid actuated master contactor 271 to connect battery 266 to the load, switch 273, ganged to switch thereby connects a first plurality 275 of cells 222 (constituting a first part of the row of cells 222) to a second plurality 277 of cells 222 (constituting a second part of the row of cells 222) in series. In the position shown, switch 269 also energizes a solenoid 279 thereby to reposition two switches 281 and 283. The repositioning of switch 281 causes battery 266 to be connected to the row of cells 222 in series, and the repositioning of switch 283 causes battery 266 and the row of cells 222 to be connected through a current-limiting resistor 285 to ground. Thus, battery 266 provides a current, limited by resistor 285, to heat cells 222 and to depassivate the anodes, breaking up films (such as an oxidation layer) that may form on the anodes. When cells 222 have been warmed, a normally closed thermal switch 287 opens, de-energizing solenoid 279 and repositioning switches 281 and 283. As shown in FIG. 14, when switch 281 is repositioned, it connects the negative terminal of the row of cells 222 to ground and switch 283 connects the positive terminal of the row of cells to the load, in parallel with battery 266. Battery 266 and the row of cells can thus provide current to the load in parallel. However, the higher voltage output of the row of cells at maximum rated current levels exceeds the voltage of battery 266, and thus the row of cells usually provides all of the power output and also keeps battery 266 charged.

Figure 15:
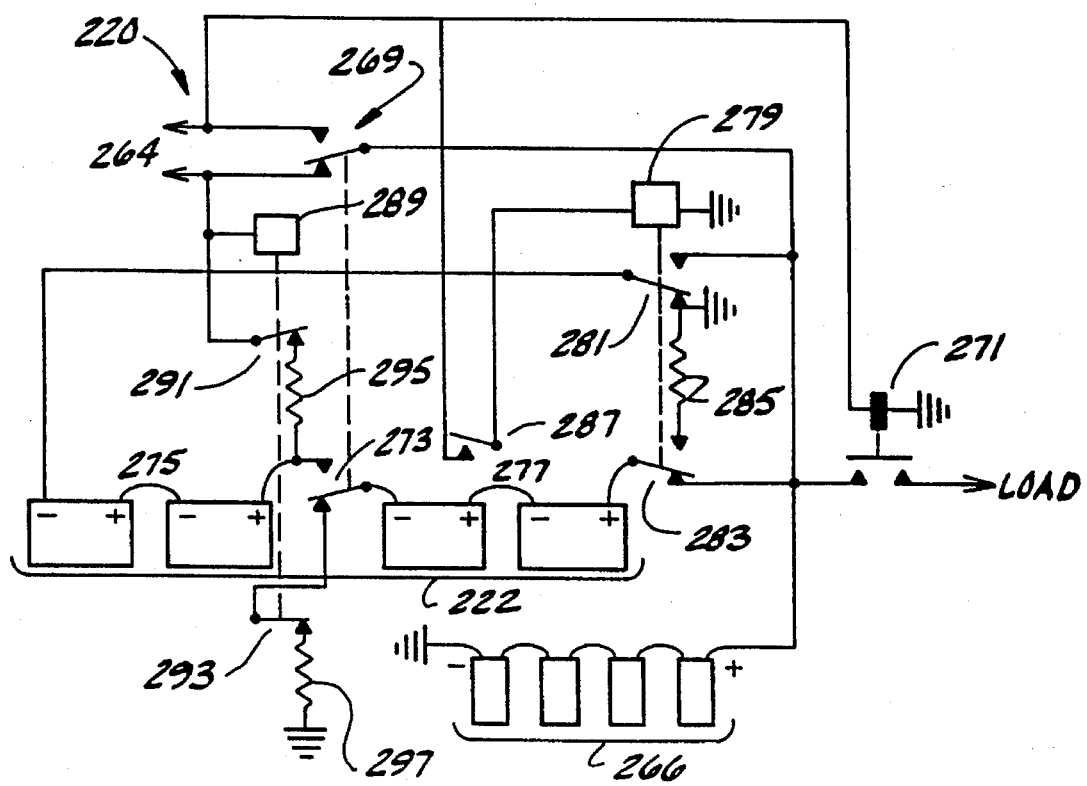
FIG. 15 is a schematic diagram of the power system during initial shut-down, immediately after being deactivated.
Figure 17:
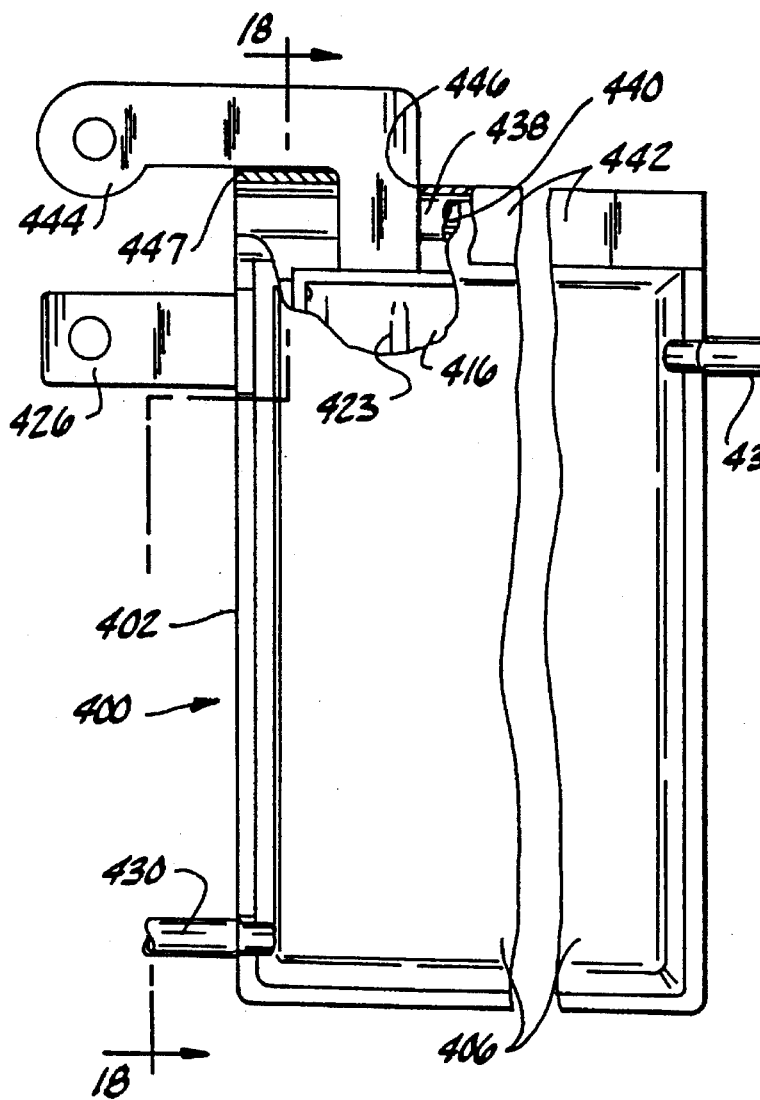
FIG. 17 is a partial front elevational view of an alternative embodiment of a metal-air cell having an openable top.
Figure 18:
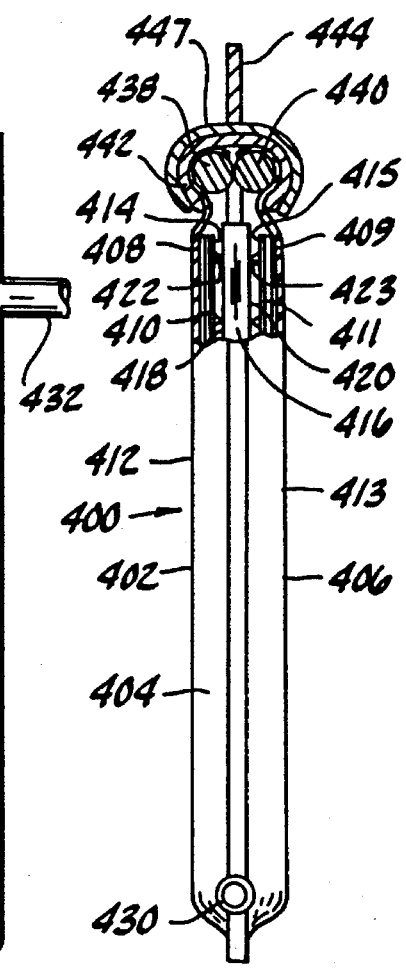
FIG. 18 is a section view taken along line 18—18 of FIG. 17.
Figure 19:
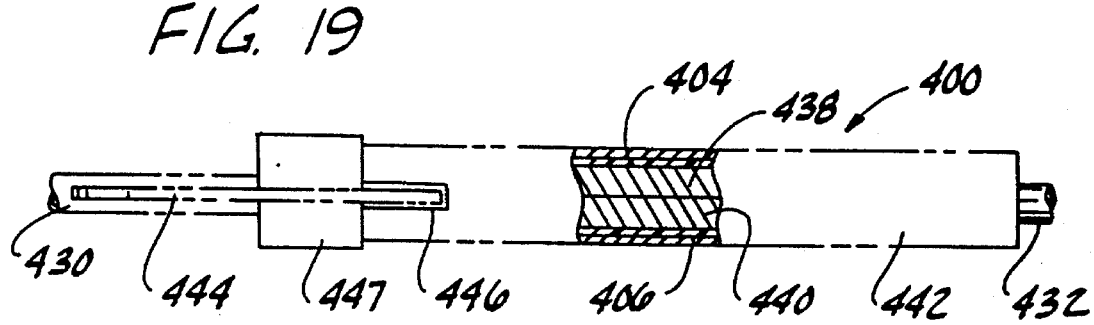
FIG. 19 is a top plan view of the metal-air cell of FIG. 17.
Figure 20:
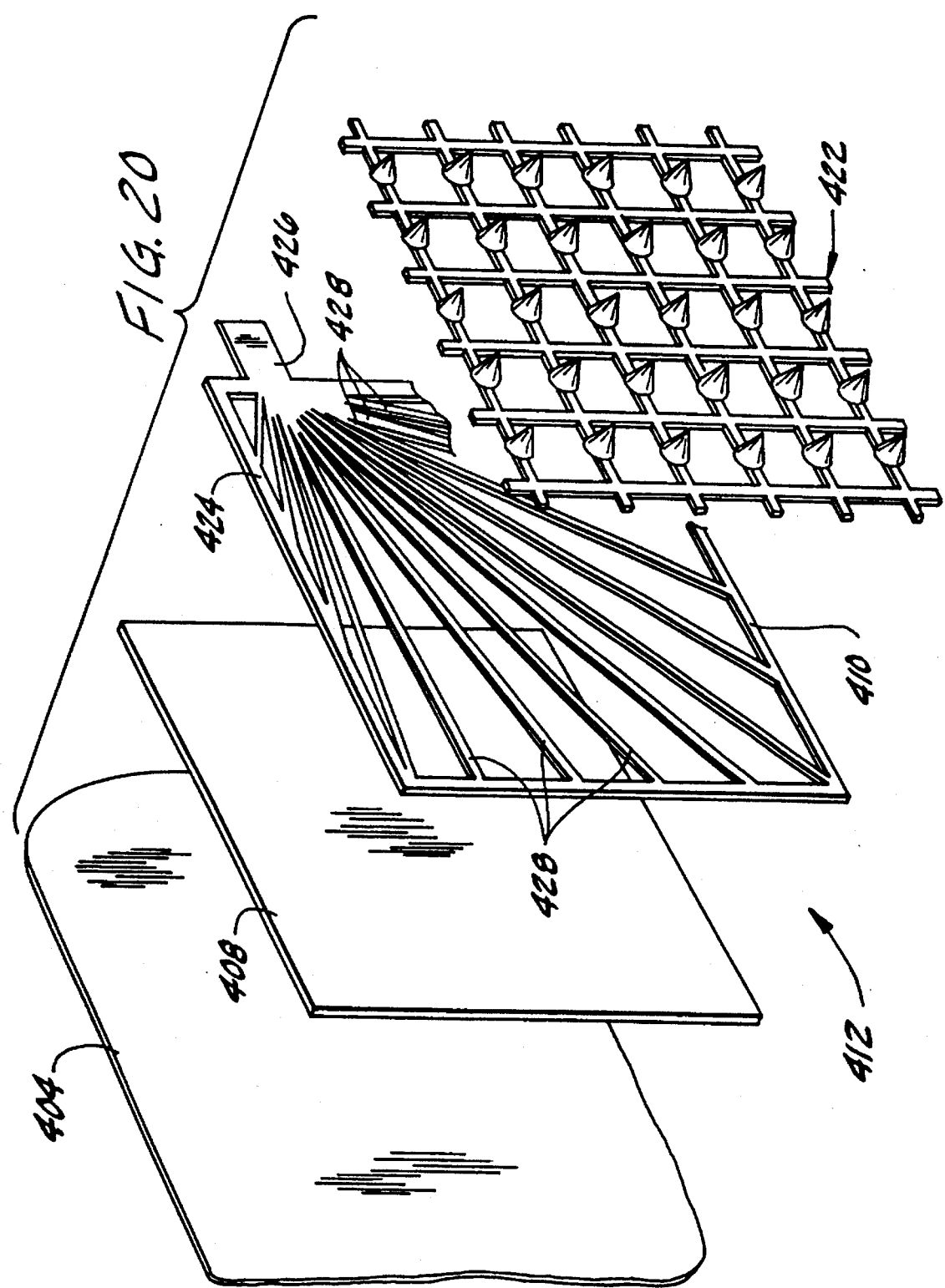
FIG. 20 is an exploded perspective view of a cathode and wall of the pouch of the metal-air cell of FIG. 17.

When the system 220 is shut down by moving switch 269 to the position shown in FIG. 15, master contactor 271 is de-energized, disconnecting the output from the load. Switch 269 also initiates operation of a corrosion inhibit timer 289 which temporarily closes two normally open switches 291 and 293, and repositions switch 273 separating first plurality 275 of cells and second plurality 277. Closing switch 291 connects battery 266 through a current-limiting resistor 295 to the positive terminal of the first plurality 275 of cells, the negative terminal of which is connected to ground. Closing switch 293 connects the negative terminal of the second plurality 277 of cells through a current-limiting resistor 297 to ground, the positive terminal of which is already connected to battery 266. With switches 291 and 293 closed, battery 266 provides positive bias voltage to protect the anodes in cells 222 from consumption. After a predetermined period, corrosion inhibit timer 289 sends a signal to controller 264 to open switches 291 and 293. Controller 264 then activates pump 230 in reverse mode to drain the electrolyte into sump 224, to prevent further consumption of the anodes.

Another embodiment of a metal-air cell, generally indicated at 334, is shown in FIG. 16. Cell 334 includes a flexible pouch 336, a metal anode 338 within pouch 336, two air cathodes 340, and two spacers 342 for preventing cathodes 340 from contacting anode 338. The primary difference between cell 334 and cell 34 is that cell 334 has two cathodes. Each cathode 340 has a substrate 378 and a current collector 380. Each substrate 378 is air-permeable and electrolyte-impermeable. Anode 336 has a first reaction face 394a opposing the inner face of one cathode and a second reaction face 394b opposing the inner face of the other cathode. Pouch 336 has first and second opposed walls 388 and 390, having first and second windows 392a and 392b, respectively. Spacers 342 are electrolyte-resistant non-conductive fibrous sheets formed of randomly oriented fibers and preferably have a thickness of approximately 3 mm. Alternatively, spacers 342 may be knitted, woven, felted, etc., and may be formed of nylon, polyamide fusing web, polyester, etc. Having cathodes opposing both faces of anode 338 doubles the reaction surface area and effectively doubles the power output of cell 334.

Another embodiment of a metal-air cell, generally indicated at 400, is shown in FIGS. 17–20. Cell 400 comprises a flexible pouch 402 having first and second walls (or panels) 404 and 406, the perimeters of which are sealed together to form a pouch having an open top. First and second panels 404 and 406 are air-permeable and electrolyte-impermeable. First and second films 408 and 409 of cathodic material, such as an activated carbonaceous material, are deposited on or embedded in the inner surfaces of first and second panels 404 and 406, respectively, and first and second current collectors 410 and 411 are secured to the inner surfaces in contact with films 408 and 409. Panels 404 and 406 constitute substrates for films 408 and 409 and support current collectors 410 and 411. Panel 404, film 408, and current collector 410 constitute a first air cathode 412 having an inner face 414; panel 406, film 409, and current collector 411 constitute a second air cathode 413 having an inner face 415. Within pouch 402 is a metal anode 416, having first and second reaction faces 418 and 420, and spacers 422 and 423. The first face 418 of anode 416 opposes inner face 414 of cathode 412 and the second face 420 opposes inner face 415 of cathode 413. Spacer 422 is between inner face 414 and first face 418 and spacer 423 is between inner face 415 and second face 420 for preventing anode 416 from contacting cathodes 412 and 413. Each current collector has a conductive rectangular frame 424 surrounding one of the films 408 or 409, an electrical terminal connector 426 adjacent a corner of frame 424, and a plurality of conductive filaments 428 each extending from electrical connector 426 to frame 424. As an alternative to the filaments, each current collector may have a grid pattern or any other suitable pattern. Connector 426 extends through pouch 402 at the sealed perimeter.

Pouch 402 includes an inlet 430 and an outlet 432 to allow electrolyte solution to be circulated through cell 400. Inlet 430 is preferably located generally adjacent the bottom of pouch 402 at the sealed perimeter, and outlet 432 is preferably located generally adjacent the top of pouch 402 at the sealed perimeter to cause thorough circulation of the electrolyte solution from inlet 430, up and across cell 400, to outlet 432. Elongate, resilient sealing beads 438 and 440 are fixedly secured to panels 404 and 406, respectively. The beads 438 and 440 are adjacent to and extend along the opening at the top of pouch 402 and are engageable with each other to seal the top of the pouch. An elongate clamp 442 fits over beads 438 and 440 to releasably compress the beads together to close and seal pouch 402. An electrical terminal connector 444 extends upwardly from anode 416 and between sealing beads 438 and 440 and through a slot 446 at one end of clamp 442. Sealing beads 438 and 440 are sufficiently yieldable to accommodate connector 444. Preferably, an end cap 447 is placed over the slotted end of clamp 442 to secure the clamp on the pouch. Clamp 442 is easily removed from pouch 402 to allow opening of the pouch to remove the remainder of the spent anode, and install a replacement anode. Clamp 442 and sealing beads 438 and 440 constitute means for releasably closing the top of the pouch to seal against leakage of electrolyte therethrough.

Although cell 400 has been described as having two cathodes, it is to be understood that activated carbonaceous material may coat or be embedded in the entire inner surface of the pouch and a current collector may blanket the entire inner surface of the pouch so that the pouch, carbonaceous material and current collector form an active cathode which envelops the anode.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of controlling an electrochemical power generating system during start-up of the system, the system comprising at least one metal-air cell, an electrolyte reservoir, and electrolyte transport means including a pump for pumping electrolyte from the reservoir and moving it through the cell, the method comprising the steps of:

(a) turning the pump on for a first duration $t_1$ and turning the pump off for a second duration $t_2$;

(b) sensing the temperature of electrolyte in the cell;

(c) repeating steps (a) and (b) until the sensed temperature of the electrolyte in the cell is at least $T_1$, and then sensing the temperature of electrolyte in the electrolyte transport means.

2. A method as set forth in claim 1 further comprising the step of repeating steps (a)–(c) until the temperature of the electrolyte in the electrolyte transport means is at least $T_S$, and then turning the pump on to run continuously.

* * * * *